3,047,400
METHOD OF MAKING SWEET CURD CHEESE
Ralph Cuomo, Casilla (P.O. Box) 9293, Santiago, Chile
No Drawing. Filed Sept. 7, 1960, Ser. No. 54,350
2 Claims. (Cl. 99—116)

This invention relates to the production of heat-treated cheese products known as a sweet curd cheese, made from non-excess acid skim milk and milk of low fat content.

One object of this invention is to disclose a method for making a sweet curd cheese.

It is still another object of this invention to provide a method of making a sweet curd cheese in which the cheese produced will be always uniform in quality and taste.

It is yet another object of this invention to provide a cheese in which the curd is soft and palatable and possesses improved keeping qualities.

It is a further object of this invention to disclose a sweet curd cheese which may be molded.

It is another object of this invention to disclose an improved process by which heat-treated cheese products of good texture can be made expeditiously and without the necessity of including the substantial proportions of cream or fat theretofore required for heat stability of such cheese products.

Additional and further objects and advantages of this invention will appear from the following description.

The cheese is sometimes known in Spanish speaking countries as "Quesillo Fresco" and in Italy it is termed either "Formaggio Fresco" or "Cacio-Ricotta."

The present invention contemplates the utilization of fresh non-excess acid milk in a quantity which constitutes 80% of the beginning mixture. The other 20% constitutes pure whole milk having a 0.6% butterfat content plus proteins, lactose and mineral salts and a solids content of 15 pounds per 100 pounds of milk.

In the event that fresh skim milk is not available in some localities during certain seasons of the year, the milk may be substituted with reconstituted spray dehydrated skim milk to which is added a quantity of butter to increase the butterfat content. The dried skim milk may be substituted for the fresh milk so that it constitutes up to 50% of the beginning mixture.

The beginning milk mixture is added to a suitable vat. A low acid starter culture is then added to the mixture. The starter employed is a curdled milk precipitated by means of strictly controlled lactic acid bacteria. The titratable acidity of the mix is controlled to within 0.19% to 0.22%. By using a low acid culture, the titratable acidity is held down, thereby preventing any appreciable decrease in the compressibility of the curds.

Once the milk mixture is in the vat and the necessary starter has been added, the resulting mixture is pasteurized by either a continuous or batch system. The minimum temperature of both systems must be 176° F. During cold winter months, it is advisable to employ somewhat higher temperatures during pasteurization.

If the substituted starting materials are used, it is necessary that this milk mixture with the added starter be homogenized, viscolized, or emulsified in order to insure a smooth texture of the mixture and the resultant cheese produced therefrom. Under these circumstances the best results for this homogenizing, viscolizing or emulsifying are obtained at 142° F., and then the pasteurization is continued. This added step also prevents the butter oil which has a light body from floating to the surface.

After the milk has been properly pasteurized, it is cooled to the setting temperature of 95° F. during the summer and 96.8° F. in the winter months. Rennet is added for a 30 minute coagulation. This fairly short setting time also, along with the previously discussed use of a low acid culture, results in a better maximum compressibility of the curds after completion of the chemical reactions, probably because there is less gassing or aeration of the curds during the shorter period. Rennet is an extract from calves' stomachs. Once the mixture becomes firm, the mass or batch is cut into small cubes. The cubed curd is permitted to settle for 5–10 minutes. The resulting whey is drained off and the proper quantity of salt may then be added.

The curd is molded into tubes of approximately 2¼ inches diameter and 8 inches long. The molds are permitted to cool on the draining table and are then refrigerated for about 12 hours at a temperature of 34° to 40° F. The molded cheese is then removed from the molds and cut by guillotine knives into units of 1 inch lengths. These units are then wrapped in moisture impermeable paper or cellophane and are ready for distribution and consumption.

The resultant product may be held in stores or house refrigerators for a week to 10 days or more while still remaining sweet.

This cheese when it is a product of wholly fresh milk may be produced with or without homogenizing, viscolizing or emulsifying and if produced with either one of these processes it gives a finer grain cheese.

The sweet curd cheese of the present invention is a food which is rich in proteins of high biological value which is easy to digest due to its low or almost zero acid content, which is unlike cottage cheese. Therefore, this cheese is good for consumption by children, adults and old people with delicate stomachs which will not tolerate acidic foods.

It will be apparent that many changes and modifications of the several features described herein may be made without departing from the spirit and scope of the invention. It is therefore apparent that the foregoing description is by way of illustration of the invention rather than limitation of the invention.

What is claimed as new is as follows:

1. A process for manufacturing a sweet curd cheese from milk of low fat content comprising forming a cheese mix including 80% skim milk and 20% whole milk, adding a lactic acid starter in an amount to effect a titratable acidity of between about 0.19 to 0.22%, then subjecting the mixture to a pasteurization temperature of about 176° F., cooling the mixture to between about 95° to 96.8° F., then treating the cooled mixture with rennet for 30 minutes to effect coagulation, draining the whey from the mixture, cubing the coagulated mixture, molding the mixture, refrigerating the mixture prior to packaging.

2. A process for manufacturing a sweet curd cheese from milk of low fat content comprising forming a cheese mix including 80% skim milk and 20% whole milk, adding a lactic acid starter in an amount to effect a titratable acidity of between about 0.19 to 0.22%, then homogenizing the mixture at 142° F., then subjecting the mixture to a pasteurization temperature of about 176° F., cooling the mixture to between about 95° to 96.8° F., then treating the cooled mixture with rennet for 30 minutes to effect coagulation, draining the whey from the mixture, cubing the coagulated mixture, molding the mixture, refrigerating the mixture prior to packaging.

References Cited in the file of this patent

UNITED STATES PATENTS

| | | |
|---|---|---|
| 1,868,422 | Luecke | July 19, 1932 |
| 2,141,698 | Saunders | Dec. 27, 1938 |
| 2,387,276 | Link | Oct. 23, 1945 |
| 2,908,575 | Spiess et al. | Oct. 13, 1959 |